United States Patent Office 2,736,163
Patented Feb. 28, 1956

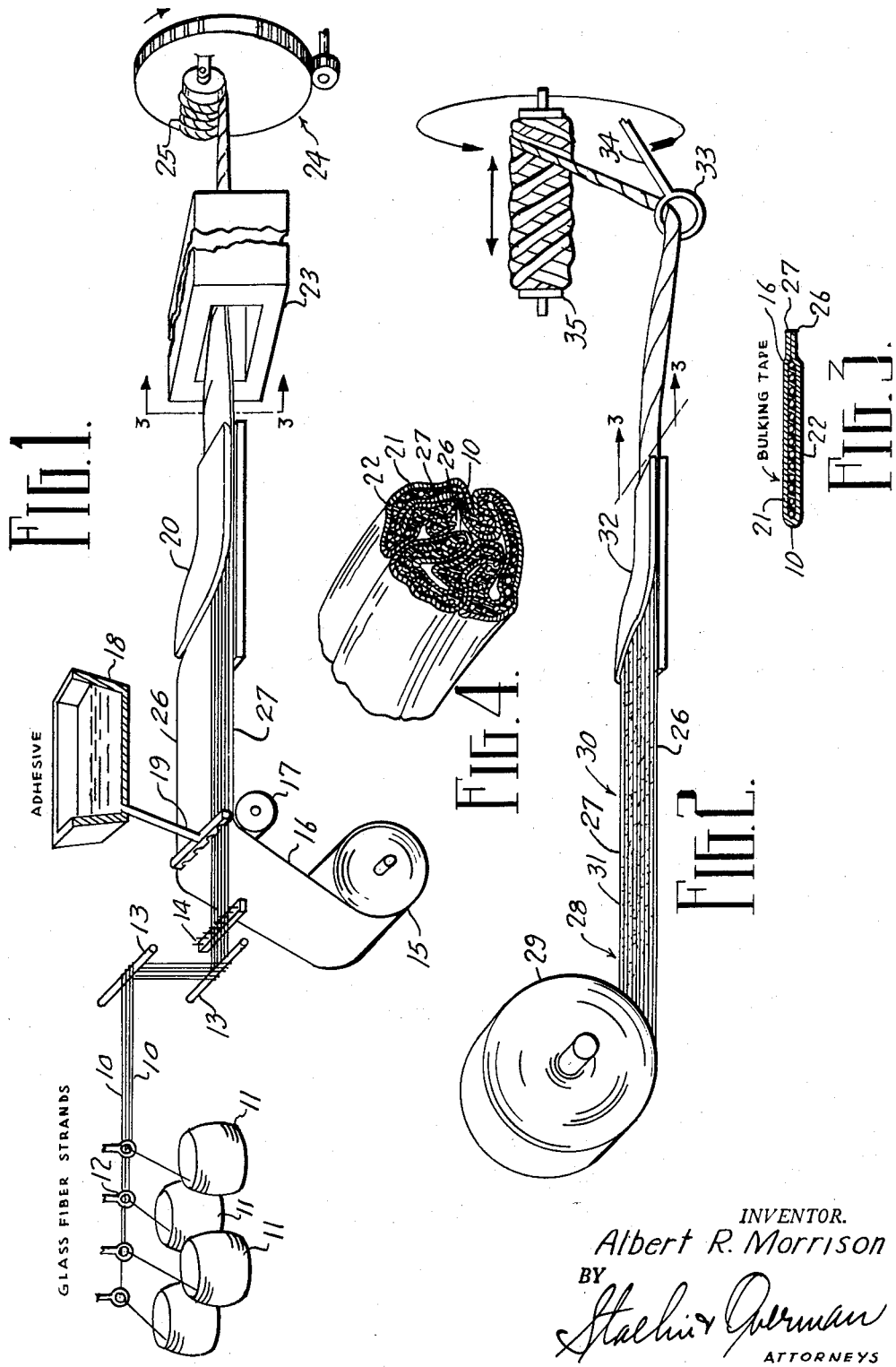
Feb. 28, 1956 A. R. MORRISON 2,736,163
GLASS FIBER TWINE AND METHOD OF MAKING THE SAME
Filed Sept. 28, 1951
INVENTOR.
Albert R. Morrison
BY
ATTORNEYS

2,736,163

GLASS FIBER TWINE AND METHOD OF MAKING THE SAME

Albert R. Morrison, Newark, Ohio, assignor to Owens-Corning Fiberglas Corporation, a corporation of Delaware Application September 28, 1951, Serial No. 248,816

15 Claims. (Cl. 57—150)

This invention relates to glass fiber twine and a method of fabricating the same and is principally directed toward the fabrication of twisted twine having high tensile strength and a high tensile/knot ratio, for use, for example, in baling and binding machines.

The object of the invention is achieved by accumulating a plurality of high tensile strength glass fibers or glass fiber strands into an oriented mass and spacing such fibers and strands from each other by intervening layers of thin, tough paper or similar strip material which serves the purpose of preventing the strands from abrading each other and of spacing them throughout the body of the twine. The thin, tough paper strip or similar material also serves as a base on which to spread an adhesive employed to adhere the strands to each other and to the paper and provides an exterior coating for the twine so as to protect the twine from external abrasion.

The high tensile strength of glass fiber strands is well known in the art but the combination of glass fiber strands with a relatively thin and tough paper to fabricate a twine overcomes difficulties inherent in the use of glass alone to provide a twine which not only has the high tensile strength to be expected from the use of glass fiber strands but also has a very high knot strength which results from bulking up the glass fibers with the paper to increase the radii through which the fibers are turned in a knot and from protecting them from each other as mentioned above.

The principal object of this invention is the provision of a tough glass fiber and paper combination twine which makes use of the advantages of high tensile strength derivable from the glass fiber and has none of the disadvantages of self-abrasion and destruction under knotting which may occur in a twine fabricated from glass fibers alone or from glass fibers and adhesives.

This specific object will be better understood from reference to the specification which follows and from the drawings in which:

Fig. 1 is a diagrammatic illustration partly in perspective of apparatus on which the process of the instant invention may be carried out for the fabrication of a twine according to the instant invention.

Fig. 2 is a view similar to Fig. 1 but of another form of apparatus designed for carrying out the process of the instant invention and for producing a twine embodying the instant invention.

Fig. 3 is a detailed vertical sectional view taken substantially on the lines 3—3 of Figs. 1 or 2.

Fig. 4 is a greatly enlarged detailed cross sectional view of a twine embodying the invention and fabricated on the apparatus of Fig. 1 or Fig. 2.

In practicing the process of the invention on the apparatus disclosed in Fig. 1, a plurality of glass fiber strands 10 are drawn off an appropriate number of spools 11 which constitute a supply thereof and led through gathering eyes 12 and then over guide bars 13 to a spacing comb 14. A roll of a sheet material, preferably a thin, tough paper 15, is provided as a supply of the sheet material which is combined with the glass fiber strands 10 in the fabrication of a twine according to the invention. A ribbon-like sheet 16 of the thin, tough paper is led up and over an idler roller 17 and the strands 10, guided by the comb 14, are laid on the upper surface of the ribbon 16, being adhered thereto by a thin coating of adhesive from a tank 18 which is spread over the surfaces of the strip 16 by a spreader 19.

It will be observed that glass fiber strands 10 are laid on the upper surface of the strip 16, preferably only along one-half of the strip 16. The adhesive in the tank 19 may be any one of numerous types, preferably one which is tacky when spread so as to adhere the strands 10 to the surface of the paper and one which will remain tacky a sufficient length of time so that as the strip 16 progresses through a forming shoe 20 which folds it along its longitudinal center line, the adhesive fills in the spaces between the strands 10 and adheres an upper layer 21 (see Fig. 3) of the strip 16 to the strands 10 as well as to a lower layer 22 of the strip 16.

The flat laminated structure shown in cross section in Fig. 3 may then be led through a heating furnace 23 if the adhesive employed is one which requires elevated temperatures for curing or setting up.

The end of the glass fiber reinforced tape is then carried to and mounted upon a twisting mechanism generally indicated at 24 which twists the tape attenuating it to form a twine and accumulates it upon a spool 25 removably mounted in the mechanism 24.

It will be observed by reference to Fig. 3 that edges 26 and 27 of the strip 16 preferably are adhered directly to each other without an intervening layer of glass fiber strands. This result is achieved by so spacing the glass fiber strands 10 with the comb 14 that they are laid upon the strip 16 leaving an unreinforced margin along one side thereof.

By referring now to Fig. 4 it will be seen that in the finished twine the edges 26 and 27 preferably are folded inwardly into the interior of the twine and that each layer of glass fiber strands 10 is protected by either the layer 21 or the layer 22 or both of the tough, thin paper in the strip 16.

The apparatus illustrated in Fig. 2 diagrammatically shows how a twine embodying the invention may be produced according to the invention from a reinforced paper tape 28 of which a roll 29 serves as a supply source. The reinforced paper tape 28, which is commercially available for packing and package reinforcement, frequently has a pressure sensitive adhesive 30 on its upper surface by means of which strands 31 of glass fibers are adhered to the tape 28.

Under some circumstances it may be desirable to employ a prefabricated reinforced tape such as the tape 28 rather than to lay glass fiber strands on a strip of thin, tough paper as is illustrated in Fig. 1. One advantage accruing from the use of a prefabricated tape as shown in Fig. 2 is the fact that the strands 31 are already securely adhered in place on the tape before twisting and thus the possibility of their being laterally shifted into contact with each other during the twisting step is reduced.

As is the case in the illustration of Fig. 1, the glass fiber reinforced tape 28 is led through a forming shoe 32 which turns half of the tape 28 over upon itself forming a structure such as that shown in section in Fig. 3. This continuous laminated reinforced tape may then be led through an eye 33 of a spinner 34 which revolves around a reciprocating spool 35 and thus the tape illustrated in cross section in Fig. 3 is twisted into the form illustrated in cross section in Fig. 4.

I claim:

1. A method for the manufacture of tough twine that comprises assembling a plurality of glass fiber strands into longitudinally generally parallel relationship, adhering said strands to a longitudinally extending strip of tough, thin, tough fibrous material transversely upon itself to form a narrow laminated tape enclosing said strands between the folds of said fibrous material and attenuating the assembled structure into a generally circular cross section.

2. A method for the manufacture of tough twine that comprises assembling a plurality of glass fiber strands into longitudinally extending generally parallel relationship, adhering said strands to a longitudinally extending strip of tough, thin fibrous material, folding said thin, tough fibrous material transversely upon itself to form a narrow laminated tape enclosing said strands between the folds of said fibrous material and twisting the assembled structure to form a twine with each of said glass fiber strands embedded between two layers of paper.

3. An adhesive-paper-glass strand twine comprising a plurality of generally spirally parallel glass fiber strands positioned between two layers of thin twisted sheet material and an adhesive adhering and embedding said strands between and to said layers of sheet material.

4. A method for the manufacture of tough twine that comprises assembling a mass of glass fiber strands into longitudinally generally parallel ribbon-like relationship, enfolding the mass of strands between the wings of a folded bulking tape, adhering the mass of strands and tape to each other and twisting the adhered structure into a twine.

5. A method for the manufacture of tough twine that comprises assembling a mass of glass fiber strands into longitudinally generally parallel ribbon-like relationship, enfolding the mass of strands between the wings of a folded bulking tape, adhering the mass of strands and tape to each other and twisting the adhered structure into a twine with the bulking tape on the exterior of the twisted twine.

6. A process for producing twine comprising the steps of coating at least a portion of one face of a thin paper web with an adhesive material, superimposing and embedding on the adhesive coated portion of said web, a plurality of glass fibrous strands, in parallel alignment, covering the strand-embedded, adhesive coated portion of said web with the remainder of said web and uniting these components into a flat assembly, thereafter twisting said assembly into a twine.

7. A method for the manufacture of twine that comprises assembling and orienting a mass of glass fiber strands into spaced, longitudinally parallel, ribbon-like relationship, coating a portion not less than the width of said ribbon-like mass of strands of one face of a web of thin paper with an adhesive, laying said ribbon-like mass of strands on the adhesive coated portion of said web, folding said web over said strands, compacting said components to form a flat assembly and then laterally attenuating said assembly to form a twine.

8. A method for the manufacture of twine that comprises assembling and orienting a mass of glass fiber strands into spaced, longitudinally parallel, ribbon-like relationship, coating approximately one-half of the width of one face of said web with an adhesive, laying said ribbon-like mass of strands on the adhesive coated portion of said web, folding the uncoated portion of said web over said strands, compacting said components to form a flat assembly and then laterally attenuating said assembly to form a twine.

9. An adhesive bonded paper glass twine comprising a plurality of parallelly extending, individually spaced glass fiber strands embedded by an adhesive between two layers of thin paper, the components being laterally compacted into generally circular cross section.

10. An adhesive bonded paper glass twine comprising at least two thin layers of paper adhered together by interfacial adhesive and a plurality of generally parallelly extending, laterally spaced, glass fiber strands embedded in said adhesive, the components being twisted together.

11. A process for producing twine comprising forming a tape by combining two layers of paper and a plurality of glass strands positioned therebetween in generally parallel relationship, adhesively bonding said strands to said paper and thereafter twisting said tape into a twine.

12. A process for producing twine comprising forming a tape by longitudinally folding a web of paper around a plurality of glass strands positioned between the infolded faces of said web, adhesively bonding said strands to said paper and thereafter twisting said tape into a twine.

13. A paper glass fiber strand twine comprising two layers of paper, a plurality of glass strands positioned therebetween in parallel relationship and an adhesive bonding said strands to said paper.

14. A paper glass fiber strand twine consisting of a twisted tape comprising two spaced, super-imposed layers of paper, a plurality of glass strands positioned therebetween in parallel relationship and an adhesive bonding said strands to said paper.

15. A paper glass fiber strand twine consisting of a twisted tape comprising a longitudinally folded web of paper, a plurality of parallel glass strands positioned on the infolded faces of said web and an adhesive bonding said strands to said faces.

References Cited in the file of this patent

UNITED STATES PATENTS

| | | |
|---|---|---|
| 2,176,019 | Cohoe | Oct. 10, 1939 |
| 2,293,246 | Fay | Aug. 18, 1942 |
| 2,523,022 | Harstman | Sept. 19, 1950 |
| 2,604,424 | Mathes | July 22, 1952 |
| 2,671,306 | Slayter | Mar. 9, 1954 |